United States Patent
Jaster

(10) Patent No.: US 8,132,375 B2
(45) Date of Patent: Mar. 13, 2012

(54) SKYLIGHT COVER WITH PRISMATIC DOME AND CYLINDER PORTIONS

(75) Inventor: Paul Jaster, Carlsbad, CA (US)

(73) Assignee: Solatube International, Inc., Vista, CA (US)

( * ) Notice: Subject to any disclaimer, the term of this patent is extended or adjusted under 35 U.S.C. 154(b) by 226 days.

(21) Appl. No.: 12/491,447

(22) Filed: Jun. 25, 2009

(65) Prior Publication Data

US 2010/0325979 A1    Dec. 30, 2010

(51) Int. Cl.
*E04B 7/18* (2006.01)
*G02B 5/04* (2006.01)
(52) U.S. Cl. ............... 52/200; 359/591; 359/599
(58) Field of Classification Search .............. 52/200, 52/173.3, 171.1; 359/591, 599; 362/557
See application file for complete search history.

(56) References Cited

U.S. PATENT DOCUMENTS

| | | | | |
|---|---|---|---|---|
| 2,858,734 A | * | 11/1958 | Boyd | 359/593 |
| 3,307,303 A | * | 3/1967 | Bloxsom | 52/200 |
| 5,228,772 A | * | 7/1993 | Mitchell et al. | 362/183 |
| 5,648,873 A | * | 7/1997 | Jaster et al. | 359/591 |
| 5,655,339 A | * | 8/1997 | DeBlock et al. | 52/200 |
| 5,896,712 A | | 4/1999 | Chao | |
| 6,035,593 A | * | 3/2000 | Chao et al. | 52/200 |
| 6,104,854 A | * | 8/2000 | Masaki et al. | 385/133 |
| 6,256,947 B1 | * | 7/2001 | Grubb | 52/200 |
| 6,456,437 B1 | | 9/2002 | Lea et al. | |
| RE38,217 E | * | 8/2003 | DeBlock et al. | 52/200 |
| 7,146,768 B2 | * | 12/2006 | Rillie | 52/200 |
| 7,185,464 B2 | | 3/2007 | Bracale | |
| 7,322,156 B1 | * | 1/2008 | Rillie et al. | 52/200 |
| 7,546,709 B2 | * | 6/2009 | Jaster et al. | 52/200 |
| 2003/0079422 A1 | | 5/2003 | Bracale | |
| 2005/0078483 A1 | * | 4/2005 | Bernard et al. | 362/327 |
| 2005/0166490 A1 | * | 8/2005 | Darmer et al. | 52/200 |

FOREIGN PATENT DOCUMENTS

GB    2 384 022    7/2003

* cited by examiner

*Primary Examiner* — Robert Canfield
*Assistant Examiner* — Brent W Herring
(74) *Attorney, Agent, or Firm* — John L. Rogitz

(57) ABSTRACT

A skylight cover has an upper dome portion formed with plural prism elements and a lower cylindrical portion extending from the open periphery of the dome portion down to terminate in an open lower end through which light can pass. A cylindrical prism ring is positioned against a surface of the cylindrical portion and bears prisms configured to refract light.

12 Claims, 3 Drawing Sheets

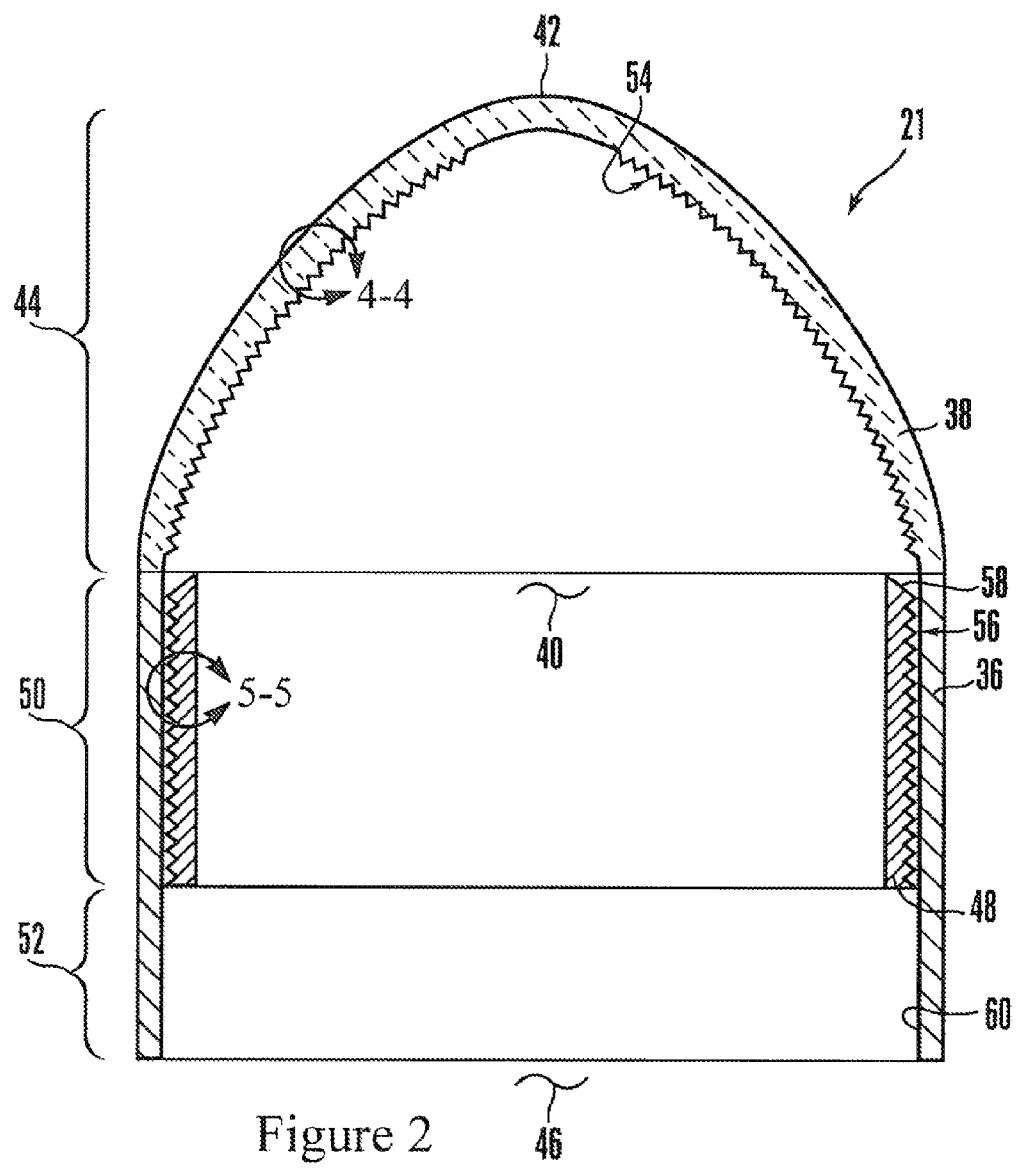
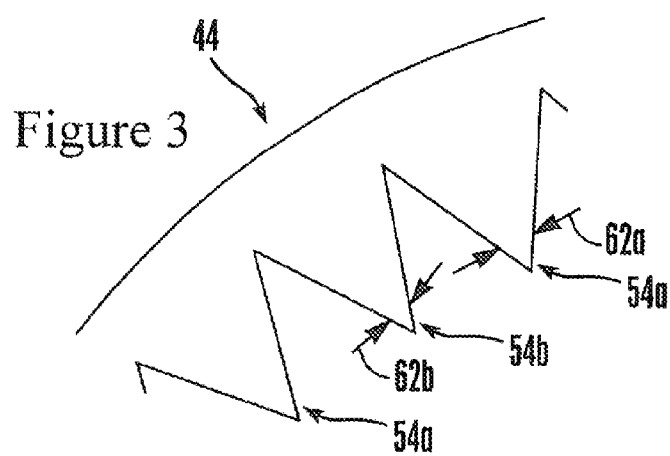

SKYLIGHT COVER WITH PRISMATIC DOME AND CYLINDER PORTIONS

FIELD OF THE INVENTION

The present invention relates generally to skylight covers.

BACKGROUND OF THE INVENTION

Briefly, a tubular skylight such as those mentioned in U.S. Pat. Nos. 5,896,713 and 6,035,593, both of which are owned by the same assignee as is the present invention and both of which are incorporated herein by reference, includes a tube assembly mounted between the roof and ceiling of a building. The top end of the tube assembly is covered by a roof-mounted cover, while the bottom end of the tube assembly is covered by a ceiling-mounted diffuser plate. With this combination, natural light external to the building is directed through the tube assembly into the interior of the building to illuminate the interior.

SUMMARY OF THE INVENTION

The present invention has recognized that to optimize the light transmission through the cover, prisms may be used on the cover, both to increase light throughput and to equalize light throughput throughout the day. But as also recognized herein, the configuration of the prisms should not unduly complicate manufacture of the cover.

Accordingly, a skylight assembly includes a skylight shaft and a skylight cover covering a top end of the shaft. The cover includes a cylindrical portion and a dome portion made integrally with the cylindrical portion and extending from the cylindrical portion to a closed apex. The dome portion is formed with prism lines. A cylindrical prism ring circumscribes an axial segment of the cylindrical portion.

In example embodiments, the prism ring is formed with prism grooves on an outer surface of the ring, which is positioned against an inner surface of the axial segment. The grooves can be perpendicular to the axis of the prism ring and the prism ring can completely circumscribe the axial segment.

If desired, the cylindrical portion of the cover can include a second axial segment that is contiguous to the first axial segment, and the second axial segment is not juxtaposed with the prism. The dome portion may be spherical in shape or may assume some other closed form, such as a pyramid.

In some implementations the dome portion is formed with first prism elements and second prism elements alternating with the first prism elements on the dome portion and circumscribing the dome portion. The first prism elements may define a first prism angle of, e.g., fifty eight degrees while the second prism elements may define a second prism angle of, e.g., sixty degrees.

In another embodiment, a skylight cover includes an upper dome portion defining an open periphery, a closed apex distanced from the open periphery, and a continuous wall therebetween enclosing all space between the open periphery to the closed apex. Plural prism elements are configured as closed circles entirely circumscribing the wall and are oriented parallel to the open periphery. A lower hollow cylindrical portion extends from the open periphery of the dome portion down to terminate in am open lower end through which light can pass. A cylindrical prism ring is positioned against a surface of the cylindrical portion. The prism ring bears prisms configured to refract light.

In another embodiment, a skylight includes a tube assembly defining upper end and lower end, a diffuser assembly covering lower end, and a cover assembly covering upper end and permitting light to pass therethrough into the tube assembly. The cover assembly has an upper dome with prisms and a lower cylinder with prisms extending between the dome and tube assembly.

The details of the present invention, both as to its structure and operation, can best be understood in reference to the accompanying drawings, in which like reference numerals refer to like parts, and in which:

BRIEF DESCRIPTION OF THE DRAWINGS

FIG. 2 is a cross-sectional view of the cover as seen along the line 2-2 in FIG. 1;

FIG. 3 is a more detailed cross-sectional view of a segment of the wall of one embodiment of the dome portion of the cover, as seen along the line 2-2 in FIG. 1;

DETAILED DESCRIPTION OF THE PREFERRED EMBODIMENT

Figure 1:
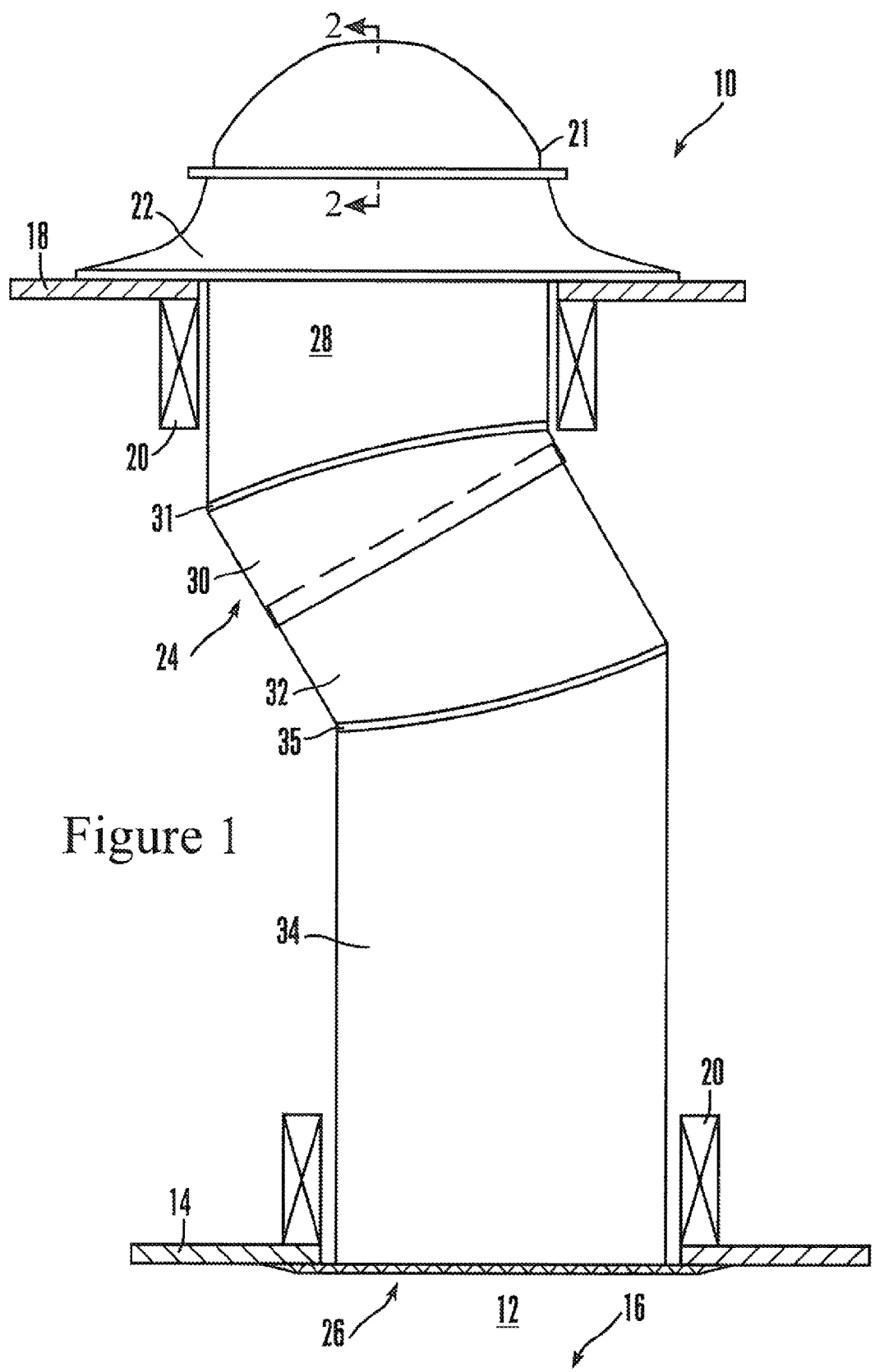
FIG. 1 is a side view in partial cross-section of an example non-limiting skylight illustrating an environment of the cover.

Referring initially to FIG. 1, a tubular skylight made in accordance with the present invention is shown, generally designated 10, for lighting, with natural sunlight, an interior room 12 having a ceiling dry wall 14 in a building, generally designated 16. FIG. 1 shows that the building 16 has a roof 18 and one or more joists 20 that support the roof 18 and ceiling dry wall 14.

As shown in FIG. 1, the skylight 10 includes a rigid hard plastic or glass roof-mounted cover 21. The cover 21 is optically transmissive and preferably is transparent. The cover 21 is discussed further below.

The cover 21 may be mounted to the roof 18 by means of a ring-like metal flashing 22 that is attached to the roof 18 by means well-known in the art. The metal flashing 22 can be angled as appropriate for the cant of the roof 18 to engage and hold the cover 21 in the generally vertically upright orientation shown.

As further shoots in FIG. 1, an internally reflective hollow metal shaft assembly, generally designated 24, is connected to the flashing 22. The cross-section of the assembly 24 can be cylindrical, rectangular, triangular, etc. Accordingly, while the word "tube" is used from time to time herein, it is to be understood that the principles of the present invention are not to be limited to a tube per se.

The shaft assembly 24 extends to the ceiling 14 of the interior room 12. Per the present invention, the shaft assembly 24 directs light that enters the shaft assembly 24 downwardly to a light diffuser assembly, generally designated 26, that is disposed in the room 12 and that is mounted to the ceiling 14 or to a joist 20 as described in the above-mentioned '593 patent.

The shaft assembly 24 can be made of a metal such as an alloy of aluminum or steel, or the shaft assembly 24 can be made of plastic or other appropriate material. The interior of the shaft assembly 24 is rendered reflective by means of, e.g., electroplating, anodizing, metalized plastic film coating, or other suitable means.

In one example embodiment, the shaft assembly 24 is established by a single shaft. However, as shown in FIG. 1, if desired, the shaft assembly 24 can include multiple segments, each one of which is internally reflective in accordance with present principles. Specifically, the shaft assembly 24 can include an upper shaft 28 that is engaged with the flashing 22 and that is covered by the cover 21. Also, the shaft assembly 24 can include an upper intermediate shaft 30 that is contiguous to the upper shaft 28 and that can be angled relative thereto at an elbow 31 if desired. Moreover, the shaft assembly 24 can include a lower intermediate shaft 32 that is slidably engaged with the upper intermediate shaft 30 for absorbing thermal stresses in the shaft assembly 24. And, a lower shaft 34 can be contiguous to the lower intermediate shaft 32 and join the lower intermediate shaft 32 at an elbow 35, with the bottom of the lower shaft 34 being covered by the diffuser assembly 26. The elbow 35 is angled as appropriate for the building 16 such that the shaft assembly 24 connects the roof-mounted cover 21 to the ceiling-mounted diffuser assembly 26. It is to be understood that where appropriate, certain joints between shafts can be mechanically fastened and covered with tape in accordance with principles known in the art.

As shown in FIG. 2, the cover 21 may include a cylindrical portion 36, and a dome portion 38. The dome portion 38 may be made integrally with the cylindrical portion 36 and may extend from an open periphery 40 to a closed apex 42 distanced from the open periphery 40, forming a continuous wall 44. The dome portion 38 may be spherical in shape, or may assume some other closed form, such as a pyramid. The cylindrical portion 36 may be hollow, and may extend from the open periphery 40 down to terminate in an open lower end 46 through which light can pass.

The cover 21 may also include a cylindrical prism ring 48 which circumscribes an axial segment 50 of the cylindrical portion 36. In some embodiments, this prism ring 48 is not unitary with the cylindrical portion 36. In embodiments that include a prism ring 48, the prism ring 48 may circumscribe the entire cylindrical portion 36 of the dome 21. Alternatively, as shown in FIG. 2 the prism ring 48 may circumscribe a first axial segment 50 of the cylindrical portion 36, but not circumscribe a second axial segment 52 that is contiguous to the first axial segment 50.

The dome portion 38 may be formed with prism elements, generally designated 54, which may be prism lines that are etched in, molded in, or otherwise integrated with or attached to the dome portion 38. The prism elements increase light throughput by capturing light originating outside the cover 21 and focusing it downward through the open periphery 40, past the cylindrical portion 36 and prism ring 48 in embodiments that include either or both, and into the tube assembly 24. The prism lines 54 may be oriented parallel to the open periphery 40, and may entirely circumscribe the dome portion 38 in concentric circles. Example prism lines 54 are described in more detail below.

In some embodiments, the prism ring 48 may itself bear prisms, generally designated 56, configured to refract light. These prisms 56 may comprise prism grooves 56 on an outer surface 58 of the prism ring 48, and may be linear when the ring is in a flat configuration and, thus, form circles when the ring 48 is bent into the cylindrical configuration shown. The outer surface 58 of the prism ring 48 may be positioned against an inner surface 60 of the axial segment 50 of the cylindrical portion 36. The prism grooves 56 may be perpendicular to the axis of the prism ring 48, i.e., may be parallel to the open lower end 46, or may be otherwise oriented. These prisms 56 are similar to the prism elements in some embodiments of the dome portion 38 in that they capture light from outside the dome 21 and focus it downward into the tube assembly 24, thereby increasing light throughput.

FIG. 3 depicts in greater detail a cross-section of a portion of one embodiment of the wall 44 of the dome portion 38, in which the wall 44 is formed with prism elements 54. In this example, an inner surface 60 of the wall 44 is formed with plural prism elements 54. All prism elements 54 may have the same prism angle, generally designated 62, but in alternate embodiments, not all prism elements 54 have the same prism angle 62. FIG. 3 shows one of the latter type of embodiment. In this example, the wall 44 of the dome portion 38 is formed with first prism elements 54*a* and second prism elements 54*b* alternating with the first prism elements 54*a*. The first prism elements 54*a* may define a first prism angle 62*a* of, e.g., fifty-eight degrees, while the second prism elements 54*b* may define a second prism angle 62*b* of, e.g., sixty degrees. However other prism angles may be used depending on the slope of the outer dome surface. The outer surface of the dome portion may be curved.

Figure 4:
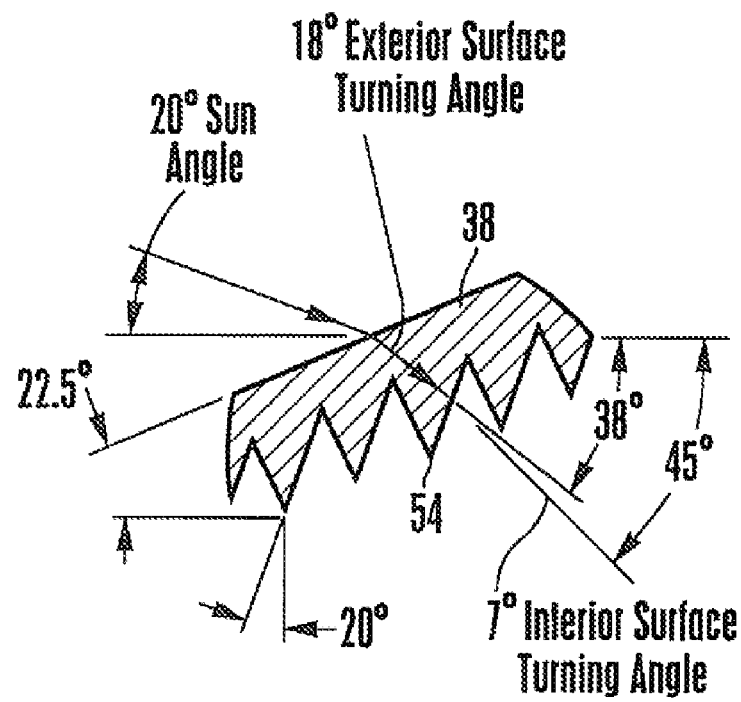
FIG. 4 is a detail of the dome portion as indicated by the circle 4-4 in FIG. 2.
Figure 5:
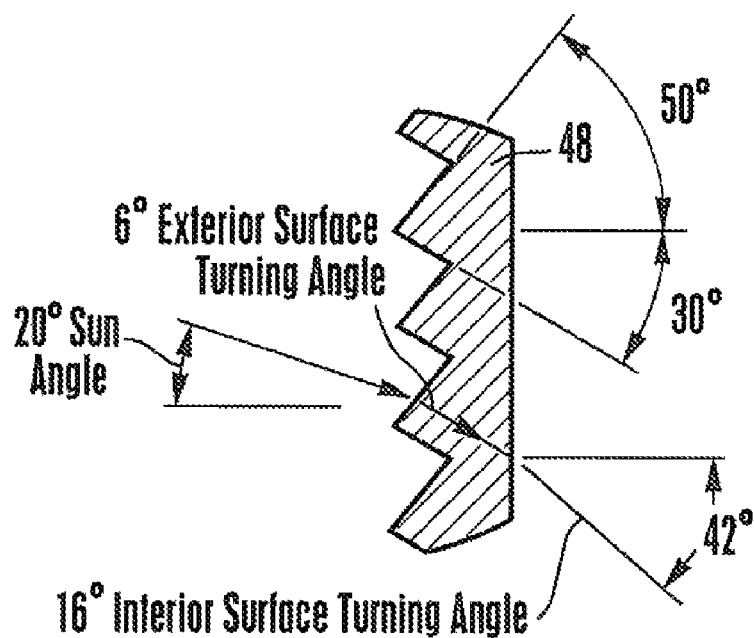
FIG. 5 is a detail of the cylindrical portion as indicated by the circle 5-5 in FIG. 2.

FIGS. 4 and 5 provide additional details on angles for given solar altitudes for the dome and cylindrical portions, respectively.

With the above description in mind, it may now be appreciated that example embodiments of present principles provide high double refraction angles without curving or shaping the cylindrical portion of the skylight cover (beyond its cylindrical shape), as well as maintain a large effective area for sunlight collection. The example provided above is relatively less complex to manufacture than other skylight covers and allows for a larger range of prism angles.

It may be further appreciated that the prism angle or angles of the dome and the prism ring portions may be designed to provide an incident angle to the sun that maximizes the range of solar altitude radiation that is desired to capture and refract the light downward. It also may be designed to provide the proper incident angle to the second surface refraction or reflection, based on where it is desired the light to go. This is facilitated by the air/polymer (low to high index) interface. This dome and prism ring may be manufactured as a single refractive index polymer and the prism ring can be coextruded or cast onto another polymer material with a higher index of refraction. The resulting second interface can also provide an additional refraction of light. The planar/flat inside surface of the prism ring can continue to refract light downward due to the polymer/air (high to low index) interface.

The cylindrical portion can be used with a variety of shaped domes (square, multisided, elliptical, etc) to capture low angle sunlight. Using appropriate transparent polymers, an aspect ratio (vertical height to horizontal aperture) of greater than 0.9.1 can be achieved.

In addition to the benefits related to increasing the aperture of a skylight at low solar elevations, the cylindrical portion can also be designed to reduce the available aperture at higher sun angles to prevent over illuminating and overheating a space. The following table illustrates this concept using two different prism angles. The 50 degree embodiment is illustrated in FIG. 5. The larger prism angle (70 degree) embodiment allows sunlight to enter the tube up to solar altitudes of 60 degrees, while the 50 degree embodiment limits sunlight collection to a solar altitude of 50 degrees: (Prism angles from horizontal)

| Solar Altitudes (degrees) | Prism Angle of 50° | Prism Angle of 70° |
|---|---|---|
| 20 | 42° | 31° |
| 30 | 55° | 42° |
| 40 | 74° | 55° |
| 50 | TIR | 72° |
| 60 | TIR | TIR |

TIR = total internal reflection, no light enters the tube/skylight from the dome.

The top of this cylinder dome can be a clear dome or a prismatic dome with the variable prism concept design. The clear dome application would be beneficial in highly diffuse climates due to the higher transmission of overhead sunlight and large aperture to the open sky. The prismatic dome would further enhance the cylinder dome in collecting direct rays of sunlight due to the aide base for large initial refraction angles.

The geometry of the cylinder portion may also vary and is not dependent on parallel sides. The walls of the cylinder portion thus may be strictly cylindrical or slightly tapered inward or outward from the base to allow more compact packaging and less room in shipping, since multiple domes can be nested together.

Accordingly, the cylindrical portion collects light on a vertical/near vertical plane to provide much higher aspect ratios for light collection. Instead of fabricating prisms into the dome interior, the above-described prism ring advantageously may be used to refract light downward without reducing the dome diameter/collection area. The planar back side of the prism ring provides an excellent downward refraction due to the high to low index junction. Using a plastic polymer with an index of refraction in the range of 1.49-1.65, the cylindrical portion of the dome can be designed with an aspect ratio that exceeds 0.9.

A computer simulation comparison of the example embodiment to a conventional clear dome is illustrated below, which compares the amount (in lumens) of sunlight collected with a clear 21 inch diameter opening to the example embodiment with an equivalent diameter and 23 inch height, at various solar altitudes.

| Solar Altitude (degrees) | Clear Dome | Dome of Example Embodiment |
|---|---|---|
| 20 | 6850 | 13880 |
| 30 | 9790 | 15840 |
| 40 | 13831 | 17150 |
| 50 | 15670 | 12750 |
| 60 | 18280 | 10480 |
| 70 | 20030 | 7270 |

As shown above, an advantageously large increase in light collection at low solar altitudes for improving illumination in the morning and evening hours is achieved along with an advantageous reduction in light/heat at the higher solar angles near midday. Additional benefits with respect to conventional skylight covers include comparatively fewer reflections down the tube, therefore less losses, smaller incident angles to the diffuser at the base of the tube, therefore higher optical transmission efficiencies, and a more uniform amount of illumination throughout the day.

While the particular SKYLIGHT COVER WITH PRISMATIC DOME AND CYLINDER PORTIONS is herein shown and described in detail, it is to be understood that the subject matter which is encompassed by the present invention is limited only by the claims.

What is claimed is:

1. A skylight assembly, comprising:
   at least one skylight shaft;
   a skylight cover covering a top end of the shaft, the cover comprising:
     a cylindrical portion;
     a dome portion made integrally with the cylindrical portion and extending from the cylindrical portion to a closed apex, the dome portion being formed with prism lines; and
     a cylindrical prism ring circumscribing an axial segment of the cylindrical portion, wherein the prism ring includes a first portion made from a material having a first refractive index and a second portion made of a material having a second refractive index different from the first refractive index, the first portion being coextruded with or cast on to the second portion to establish a refractive interface therebetween providing refraction of light.

2. The assembly of claim 1, wherein the prism ring is formed with prism grooves on an outer surface of the ring positioned against an inner surface of the axial segment.

3. The assembly of claim 2, wherein the grooves are perpendicular to the axis of the prism ring.

4. The assembly of claim 1, wherein the prism ring completely circumscribes the axial segment.

5. The assembly of claim 1, wherein the axial segment is a first axial segment and the cylindrical portion of the cover further comprises a second axial segment contiguous to the first axial segment, the second axial segment not being juxtaposed with the prism.

6. The assembly of claim 1, wherein the dome portion is spherical in shape.

7. The assembly of claim 1, wherein the dome portion is not spherical.

8. The assembly of claim 1, wherein the dome portion is formed with first prism elements and second prism elements, the first prism elements alternating with the second prism elements on the dome portion and circumscribing the dome portion, the first prism elements defining a first prism angle and the second prism elements defining a second prism angle different from the first prism angle.

9. The assembly of claim 8, wherein the first prism angle is fifty eight degrees and the second prism angle is sixty degrees.

10. Skylight, comprising:
    tube assembly defining upper end and lower end;
    diffuser assembly covering lower end;
    cover assembly covering upper end and permitting light to pass therethrough into the tube assembly, the cover assembly comprising an upper dome with prisms and a lower cylinder with prisms extending between the dome and tube assembly; and
    a cylindrical prism ring positioned against a surface of the lower cylinder and bearing prisms configured to refract light to establish the prisms of the lower cylinder.

11. Skylight of claim 10, wherein the dome is formed with first prism elements and second prism elements, the first prism elements alternating with the second prism elements on the dome and circumscribing the dome, the first prism elements defining a first prism angle and the second prism elements defining a second prism angle different from the first prism angle.

12. Skylight of claim 10, wherein the first prism angle is fifty eight degrees and the second prism angle is sixty degrees.

* * * * *